United States Patent
Kim

(10) Patent No.: US 10,593,211 B2
(45) Date of Patent: Mar. 17, 2020

(54) APPARATUS AND METHOD FOR CONTROLLING PLATOONING OF VEHICLES

(71) Applicants: Hyundai Motor Company, Seoul (KR); Kia Motors Corporation, Seoul (KR)

(72) Inventor: SangJun Kim, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 121 days.

(21) Appl. No.: 15/909,781

(22) Filed: Mar. 1, 2018

(65) Prior Publication Data
US 2019/0147745 A1 May 16, 2019

(30) Foreign Application Priority Data
Nov. 13, 2017 (KR) .................. 10-2017-0150320

(51) Int. Cl.
G08G 1/16 (2006.01)
G05D 1/02 (2020.01)
G08G 1/00 (2006.01)
B60W 30/165 (2020.01)

(52) U.S. Cl.
CPC ........... *G08G 1/167* (2013.01); *G05D 1/0293* (2013.01); *G05D 1/0295* (2013.01); *G08G 1/22* (2013.01); *B60W 30/165* (2013.01); *G05D 2201/0213* (2013.01)

(58) Field of Classification Search
CPC . B60W 30/165; G05D 1/0293; G05D 1/0295; G05D 2201/0213; G08G 1/167; G08G 1/22
See application file for complete search history.

(56) References Cited

U.S. PATENT DOCUMENTS

| 5,777,451 | A  | * | 7/1998  | Kobayashi  | B61L 23/34 180/169 |
| 8,660,779 | B2 | * | 2/2014  | Shida      | B60W 30/16 701/117 |
| 9,147,353 | B1 | * | 9/2015  | Slusar     | G09B 19/167 |
| 9,423,794 | B2 | * | 8/2016  | Lind       | G05D 1/0278 |
| 9,645,579 | B2 | * | 5/2017  | Switkes    | G08G 1/22 |
| 9,842,263 | B2 | * | 12/2017 | Kim        | G06K 9/325 |
| 10,073,464 | B2 | * | 9/2018 | Pilkington | G05D 1/0295 |
| 10,074,894 | B1 | * | 9/2018 | Birnbaum   | H01Q 1/3266 |

(Continued)

FOREIGN PATENT DOCUMENTS

JP 2002-266672 A 9/2002
JP 2008-074210 A 4/2008
(Continued)

*Primary Examiner* — Tyler J Lee
(74) *Attorney, Agent, or Firm* — Morgan, Lewis & Bockius LLP

(57) ABSTRACT

An apparatus and method for controlling platooning of vehicles includes: a manipulation portion configured to input an operation command when a lane change is needed during the platooning; a detector portion configured to recognize Blind-spot Collision Warning (BCW) information regarding the plurality of vehicles; and a controller configured to perform the lane change using the BCW information according to the operation command.

18 Claims, 6 Drawing Sheets

(56) References Cited

U.S. PATENT DOCUMENTS

| | | | |
|---|---|---|---|
| 2010/0256852 A1* | 10/2010 | Mudalige | G08G 1/163 701/24 |
| 2013/0030606 A1* | 1/2013 | Mudalige | G08G 1/22 701/2 |
| 2016/0267796 A1 | 9/2016 | Hiroma et al. | |
| 2017/0011633 A1 | 1/2017 | Boegel | |
| 2017/0369067 A1* | 12/2017 | Saigusa | B60W 30/18163 |
| 2018/0037227 A1* | 2/2018 | D'sa | B60W 30/16 |
| 2018/0050673 A1* | 2/2018 | D'sa | B60W 30/0953 |
| 2018/0079419 A1* | 3/2018 | Yamamoto | B60R 21/00 |
| 2018/0137763 A1* | 5/2018 | Derag Rden | G05D 1/0295 |
| 2018/0188746 A1* | 7/2018 | Lesher | G05D 1/0295 |
| 2018/0190119 A1* | 7/2018 | Miller, Jr. | G08G 1/166 |
| 2018/0253976 A1* | 9/2018 | Inam | H04W 4/046 |
| 2019/0084537 A1* | 3/2019 | Kasper | B60T 8/1708 |
| 2019/0147263 A1* | 5/2019 | Kuehnle | B60W 40/09 340/439 |
| 2019/0152525 A1* | 5/2019 | Resch | B62D 15/0255 |

FOREIGN PATENT DOCUMENTS

| | | |
|---|---|---|
| JP | 2014-078170 A | 5/2014 |
| KR | 10-2017-0037681 A | 4/2017 |
| WO | WO 2015/047174 A1 | 4/2015 |

* cited by examiner

APPARATUS AND METHOD FOR CONTROLLING PLATOONING OF VEHICLES

CROSS-REFERENCE TO RELATED APPLICATION

The present application claims priority to Korean Patent Application No. 10-2017-0150320, filed on Nov. 13, 2017, the entire contents of which is incorporated herein for all purposes by this reference.

BACKGROUND OF THE INVENTION

Field of the Invention

The present invention relates to an apparatus and method for controlling platooning (also called cluster driving) of vehicles.

Description of Related Art

Generally, various vehicle safety systems have been embedded in a vehicle in consideration of convenience and safety of a driver or user.

The vehicle safety systems may include a Lane Keeping Assist System (LKAS) for preventing vehicle departure from a traveling lane by assisting steering wheel manipulation of the driver when one or more vehicles travel on roads, a Smart Cruise Control System (SCCC) for maintaining a proper constant distance gap (CDG) between vehicles during vehicle traveling, an Electronic Stability Control (ESC) system for stably maintaining vehicle attitude, a navigation system for providing the driver with a route to a driver-selected destination and information regarding peripheral regions based on the route, etc.

In recent times, many developers and companies are conducting intensive research into platooning technology for allowing a plurality of vehicles to travel on the same route while simultaneously maintaining a predetermined constant distance gap (CDG) between the vehicles such that several following vehicles located behind a leading vehicle travel the same route as the leading vehicle. The vehicle platooning technology has advantages in that fuel efficiency is improved by reduction of air resistance of each following vehicle following the leading vehicle, resulting in improvement of the driver's convenience of each vehicle.

However, since a visual field of the driver who rides in the following vehicle is restricted or obstructed, there is a high risk of traffic accidents when there is a need to change lanes (due to traffic accident vehicles, road construction/damage, highway entrance/exit, or the like). Therefore, a control logic and scenario for automatically changing lanes are needed.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus and method for controlling platooning of vehicles to implement a control logic configured for automatically coping with a lane change situation encountered in platooning of vehicles.

Additional aspects of the present invention will be set forth in part in the description which follows and, in part, will be obvious from the description, or may be learned by practice of the present invention.

In accordance with an aspect of the present invention, an apparatus configured for controlling platooning of a plurality of vehicles that travels the same route together in a platoon while simultaneously maintaining a constant distance gap (CDG) therebetween includes: a manipulation portion configured to input an operation command when a lane change is needed during the platooning; a detector portion configured to recognize Blind-spot Collision Warning (BCW) information regarding the plurality of vehicles; and a controller configured to perform the lane change using the BCW information according to the operation command.

The plurality of vehicles may construct a CACC (Cooperative Adaptive Cruise Control) system—based traveling sequence, and may travel a platooning mode in which the plurality of vehicles follows a leading vehicle (LV).

The manipulation portion may allow a driver of the leading vehicle (LV) to input the operation command. The manipulation portion may be comprised of a turn signal lamp.

The controller may increase the constant distance gap (CDG) according to operation of the turn signal lamp, and may switch the platooning mode to a lane change mode.

The detector portion may include a Blind-spot Collision Warning (BCW) system mounted to each of the vehicles.

The BCW information may be used to detect whether a moving object is present at a rear lateral side of each of the vehicles.

The controller may perform the lane change, when the moving object is not present at the rear lateral side of each of the vehicles.

When the presence of the moving object is detected, the controller may be configured to control subsequent vehicles including a corresponding vehicle having detected the moving object to switch to a longitudinal following mode and a manual mode.

The longitudinal following mode may automatically control a constant distance gap (CDG) between each vehicle and the leading vehicle (LV), and may allow a lateral direction of the platooning to be controlled by a driver.

In accordance with another aspect of the present invention, an apparatus configured for controlling platooning of a plurality of vehicles that travels the same route together in a platoon while simultaneously maintaining a constant distance gap (CDG) therebetween includes: a manipulation portion configured to input an operation command when a lane change is needed during the platooning; a detector portion configured to recognize Blind-spot Collision Warning (BCW) information regarding the plurality of vehicles; and a controller configured to increase the constant distance gap (CDG) according to the operation command, and perform the lane change using the BCW information. The BCW information detects presence or absence of a moving object at a rear lateral side of each of the plurality of vehicles, and the controller performs the lane change when the moving object is not present at the rear lateral side of each of the plurality of vehicles.

A driver of each of following vehicles (FVs) following the leading vehicle (LV) may determine whether the lane change will be automatically or manually performed using the BCW information, and may inform the leading vehicle (LV) of the determined result.

When the driver of each of the following vehicles (FVs) operates the same turn signal lamp as the operated turn signal lamp, the controller may switch a mode of the lane change to an automatic mode.

When the driver of each of the following vehicles (FVs) operates another turn signal lamp different from the operated turn signal lamp, the controller may switch a mode of the lane change to a manual mode.

In accordance with another aspect of the present invention, a method for controlling platooning of a plurality of vehicles traveling in a platooning mode in which the plurality of vehicles follows a leading vehicle while simultaneously maintaining a CACC (Cooperative Adaptive Cruise Control)—based constant distance gap (CDG) therebetween, includes: determining whether a lane change is needed during the platooning mode; operating a turn signal lamp when the lane change is needed, and inputting a lane change command; increasing a constant distance gap (CDG) between the plurality of vehicles according to the lane change command; recognizing Blind-spot Collision Warning (BCW) information regarding each of the plurality of vehicles; and switching the platooning mode to a lane change mode using the BCW information. The lane change mode performs the lane change when a moving object is not present at a rear lateral side of each of the plurality of vehicles.

The method may further include: when the presence of the moving object is detected, allowing subsequent vehicles including a corresponding vehicle having detected the moving object to switch to a longitudinal following mode and a manual mode.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
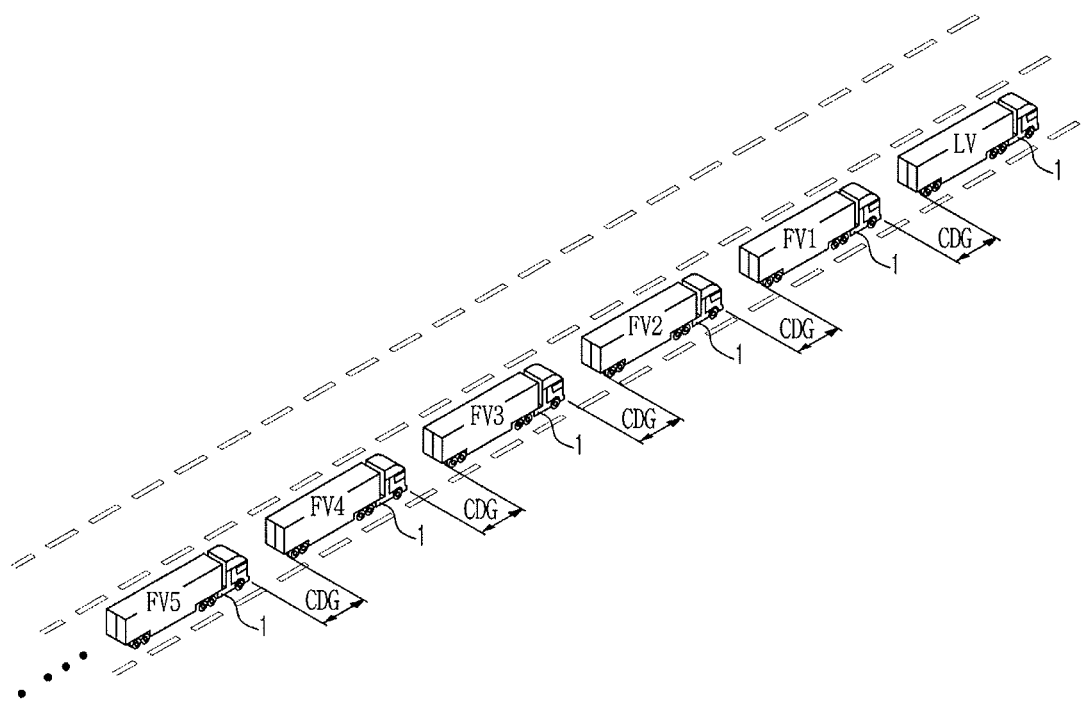
FIG. 1 is a view illustrating platooning of vehicles according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Reference will now be made in detail to the exemplary embodiments of the present invention, examples of which are illustrated in the accompanying drawings, wherein like reference numerals refer to like elements throughout.

The terms used in the present application are merely used to describe specific embodiments and are not intended to limit the present invention. A singular expression may include a plural expression unless otherwise stated in the context. In the present application, the terms "including" or "having" are used to indicate that features, numbers, steps, operations, components, parts or combinations thereof described in the present embodiment are present and presence or addition of one or more other features, numbers, steps, operations, components, parts or combinations is not excluded.

In description of the present invention, the terms "first" and "second" may be used to describe various components, but the components are not limited by the terms. The terms may be used to distinguish one component from another component. For example, a first component may be called a second component and a second component may be called a first component without departing from the scope of the present invention. The term "and/or" may include a combination of a plurality of items or any one of a plurality of items.

An apparatus and method for controlling platooning of vehicles according to an exemplary embodiment of the present invention will hereinafter be described with reference to the appended drawings.

FIG. 1 is a view illustrating platooning of vehicles according to an exemplary embodiment of the present invention. Referring to FIG. 1, a plurality of vehicles 1 may construct a sequence of vehicles (hereinafter referred to as a platoon) based on a Cooperative Adaptive Cruise Control (CACC) system, such that the vehicles 1 may travel together in a platoon (hereinafter referred to as platooning).

The CACC system is a technology for improving acceleration or deceleration of the vehicles 1.

In FIG. 1, platooning may indicate that a plurality of vehicles (LV, FV1, FV2, FV3, FV4, FV5 . . . ) travels together in a platoon (or convoy) on the same track while simultaneously maintaining a constant inter-vehicle distance (e.g., 5~15 m) therebetween, when a large amount of freight (or load) must be simultaneously transported while being divided into vehicles 1 (e.g., heavy-duty trucks) or several vehicles 1 attending a ceremony or event must travel together in a procession.

During platooning, at least one following vehicle (hereinafter referred to as FV) may follow the same track as a leading vehicle (hereinafter referred to as LV). To the present end, it may be possible to recognize traveling information related to the LV and the FVs (FV1, FV2, FV3, FV4, FV5 . . . ) using various detectors embedded in the vehicle 1. It may also be possible to maintain a Constant Distance Gap (hereinafter referred to as CDG) between vehicles 1 using information regarding Vehicle-to-Vehicle (V2V) communication.

Platooning may increase fuel efficiency by reducing air resistance of the FVs (FV1, FV2, FV3, FV4, FV5 . . . ) following the LV, and may increase driver convenience of each vehicle 1.

Each of the platooning vehicles (LV, FV1, FV2, FV3, FV4, FV5 . . . ) may include a Blind-spot Collision Warning (BCW) system that recognizes and warns of the presence of a moving object approaching at a high speed from a blind spot or the rear region not recognized by outside mirrors mounted to each vehicle.

The platooning vehicles (LV, FV1, FV2, FV3, FV4, FV5 . . . ) according to the exemplary embodiment may be implemented as electric vehicles (e.g., Electric Vehicles (EVs), Hybrid Electric Vehicles (HEVs), and/or Fuel Cell Electric Vehicles (FCEVs)).

Figure 2:
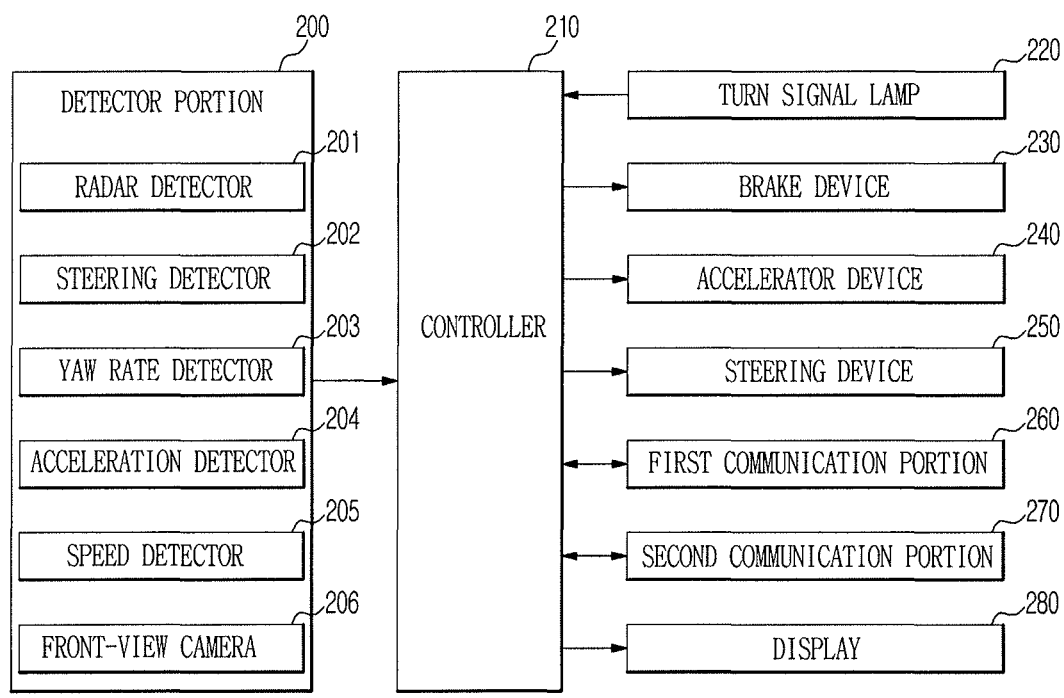
FIG. 2 is a block diagram illustrating a block diagram illustrating a method for controlling platooning of vehicles according to an exemplary embodiment of the present invention.

FIG. 2 is a block diagram illustrating a method for controlling platooning of vehicles according to an exemplary embodiment of the present invention. The concept of FIG. 2 will be described centering around a method for controlling platooning of a host vehicle (hereinafter referred to as ego vehicle).

Referring to FIG. 2, each vehicle 1 may include a detector portion 200, a controller 210, a turn signal lamp 220, a brake device 230, an accelerator device 240, a steering device 250, a first communication portion 260, a second communication portion 270, and a display 280.

The turn signal lamp 220 may be mounted to the vehicle 1. During platooning of the vehicle 1, when a driver of the vehicle 1 discovers an obstacle and decides to change lanes, the driver may manipulate the turn signal lamp 220 to change from a platooning mode to a lane change mode.

The detector portion 200 may be mounted to the vehicle 1 to recognize traveling information (traveling situation) of the vehicle 1. The detector portion 200 may include a radar detector 201, a steering angle detector 202, a yaw rate detector 203, an acceleration detector 204, a speed detector 205, and a front-view camera 206.

The radar detector 201 may emit a laser beam in a forward direction of the vehicle 1 to detect an obstacle present on a road, may detect the presence or absence of an obstacle and a front vehicle using the laser beam reflected from the obstacle and the front vehicle, may measure a time difference between a beam emission time and a reception time of the reflected laser beam, measuring a constant distance gap (CDP) between the ego vehicle and the front vehicle.

The steering angle detector 202 may be mounted to a steering column, may detect a steering angle adjusted by the steering wheel, and may transmit the detected steering angle to the controller 210.

The yaw rate detector 203 may detect a yaw moment generated when the vehicle 1 turns to the right or left, and may output the detected yaw moment to the controller 210. The yaw rate detector 230 may include a cesium crystal element therein. When the vehicle 1 moves and turns, the yaw rate detector 203 may generate a voltage by turning of the cesium crystal element. The yaw rate detector 203 may measure a yaw rate of the vehicle 1 on the basis of the generated voltage. Thereafter, the measured yaw rate value may be transmitted to the controller 210.

The acceleration detector 204 may measure an acceleration of the vehicle 1. The acceleration detector 204 may include a lateral acceleration detector and a longitudinal acceleration detector.

Assuming that a moving direction of the vehicle 1 is defined as an X-axis and a vertical-axis (Y-axis) direction perpendicular to the moving direction is defined as a lateral direction thereof, the lateral acceleration detector may measure acceleration in the lateral direction thereof.

The longitudinal acceleration detector may measure acceleration in the X-axis indicating the moving direction of the vehicle 1.

The speed detector 205 may be mounted to front wheels and rear wheels, may detect a speed of each wheel during driving of the vehicle 1, and may output information regarding the detected speed to the controller 210.

The front-view camera 206 may be implemented as a Lane Departure Warning System (LDWS) camera for recognizing a traveling lane of the vehicle 1.

The LDWS camera may be mounted to a front side of the vehicle 1. For example, the LDWS camera may be mounted to an inner surface of a windshield 17 at a lower portion of a rear-view mirror. The LDWS camera may detect an image of a lane of a front road, and may confirm a current lane of the vehicle 1. Thereafter, when the driver of the vehicle 1 is more likely to perform drowsy or careless driving, the LDWS camera may provide the driver with a warning sound or the like.

The detector portion 200 may include various detectors mounted to the vehicle 1, for example, a Parking Assist System (PAS) detector, etc.

The controller 210 may be an electronic controller unit (ECU) for controlling overall operation of the vehicle 1, and may control various modules or devices embedded in the vehicle 1. In accordance with an embodiment, the controller 210 may operate by a processor embedded in the vehicle 1. The controller 210 may generate a control signal for controlling constituent elements of various modules and devices embedded in the vehicle 1, and may control operation of the constituent elements using the control signal.

The controller 210 may receive traveling and operation information (operation information related to the turn signal lamp) of the vehicle 1, and may control platooning of the vehicle 1 using the received traveling and operation information.

In accordance with an embodiment, the controller 210 may receive a signal from the detector portion 200, may determine a traveling situation of the vehicle 1, may generate a route, and may control lateral/longitudinal-directional actuators. To the present end, the controller 210 may generate a lane change mode to automatically cope with lane change generated in platooning of the vehicle 1. The lane change mode may implement a control scenario for guaranteeing safety and convenience in a response to various situations generated in the lane change during platooning.

To the present end, the controller 210 may be configured to implement a scenario for controlling the lane change mode using the turn signal lamp 220.

The controller 210 may use a Controller Area Network (CAN) of the vehicles 1. The CAN may refer to a network system to perform communication between electronic control units (ECUs) as well as to control the ECUs. In more detail, the CAN may transmit data through a pair of twisted data lines or a pair of shield data lines shielded with a covering material. The CAN may operate according to multi-master principles in which each ECU for use in master/slave systems may operate as a master. The controller 210 may also perform data communication either through an in-vehicle wired network (for example, a Local Interconnect Network (LIN), Media Oriented System Transport (MOST), etc. of the vehicle 1) or through a wireless network including a Bluetooth network.

The controller 210 may include a memory to store programs for performing the aforementioned and following operations and various kinds of data associated with the programs, a processor to execute the programs stored in the memory, and a hydraulic control unit (HCU), a microcontroller unit (MCU), etc. each of which acts as a hydraulic control device. The controller 210 may be integrated into a System On Chip (SOC) embedded in each vehicle 1, and may operate by the processor. However, one or more SOCs may be embedded in the vehicle 1, and the scope or spirit of the present invention is not limited to only one SOC.

The controller 210 may be implemented as at least one of a flash memory type, a hard disk type, a multimedia card micro type, a card type memory (e.g. a Secure Digital (SD) memory or an eXtreme Digital (XD) memory), a Random Access Memory (RAM), a Static Random Access Memory (SRAM), a Read Only Memory (ROM), an Electrically Erasable Programmable Read Only Memory (EEPROM), a Programmable Read Only Memory (PROM), a magnetic memory, a magnetic disk, an optical disc, etc. However, the scope or spirit of the controller 210 according to an exemplary embodiment of the present invention is not limited thereto, and may also be implemented as another format well-known to those skilled in the art.

The brake device 230 may control braking force of each vehicle 1. The brake device 230 may include an Autonomous Emergency Braking (AEB) system, an Anti-Lock Braking System (ABS), an Electronic Stability Control (ESC) system, etc.

The accelerator device 240 may control engine torque according to an engine control signal received from the controller 210, and may cooperate with a TCS control block to guarantee maximum stability of the vehicle 1, controlling driving force of the engine.

The steering device 250 may be a steering assist device configured for assisting steering of the vehicle 1, and may include Electric Power Steering (EPS) and Motor Driven Power Steering (MDPS).

The first communication portion 260 may be a Vehicle-to-Vehicle (V2V) communication module for supporting communication between the leading vehicle (LV) and the ego vehicle corresponding to the following vehicle (FV), may receive traveling information related to the leading vehicle (LV), and may transmit traveling information related to the ego vehicle to the leading vehicle (LV).

The second communication portion 270 may be a Vehicle-to-Vehicle (V2V) communication module for supporting communication between the ego vehicle and the following vehicle (FV), may receive traveling information related to the following vehicle (FV), and may transmit traveling information related to the ego vehicle to the following vehicle (FV).

As described above, the first communication portion 260 and the second communication portion 270 may perform communication among the vehicles 1 (i.e., the ego vehicle, the leading vehicle (LV), and the following vehicle (FV)) to transmit traveling information as well as to perform a control scenario.

The first communication portion 260 and the second communication portion 270 may include a Wireless Fidelity (Wi-Fi) communication module to connect to a local area network (LAN) through an access point (AP) or the like, a Bluetooth communication module to communicate with a single external device on a one-to-one basis or to communicate with a small number of external devices on a one-to-multiple basis, a broadcast signal reception (Rx) module to receive a digital broadcast signal, and a position information reception (Rx) module to receive position information related to the vehicle 1 from a satellite or the like.

Furthermore, the first communication portion 260 and the second communication portion 270 may also be connected to other devices using any one of GSM/3GPP-based schemes (GSM, HSDPA, LTE Advanced, etc.), 3GPP2-based schemes (such as CDMA), or WiMAX-based communication schemes.

The first communication portion 260 and the second communication portion 270 may receive position information from the GPS satellites by communicating with the GPS satellites, and may receive map information from a server located at a remote site.

The first communication portion 260 and the second communication portion 270 may be connected to other devices, and may transmit and receive multimedia data to or from the other devices. In more detail, the first communication portion 260 and the second communication portion 270 may be connected to a mobile terminal located adjacent to the vehicle 1 or the server located at a remote site, and may transmit multimedia data from the mobile terminal or the server.

The display 280 may display Blind-spot Collision Warning (BCW) information and traveling information related to the vehicle 1 according to a display control signal of the controller 210. The display 280 may include a cluster, an Audio Video Navigation (AVN) device, or the like.

An apparatus and method for controlling platooning of vehicles according to an exemplary embodiment of the present invention will hereinafter be described with reference to the appended drawings.

Figure 3:
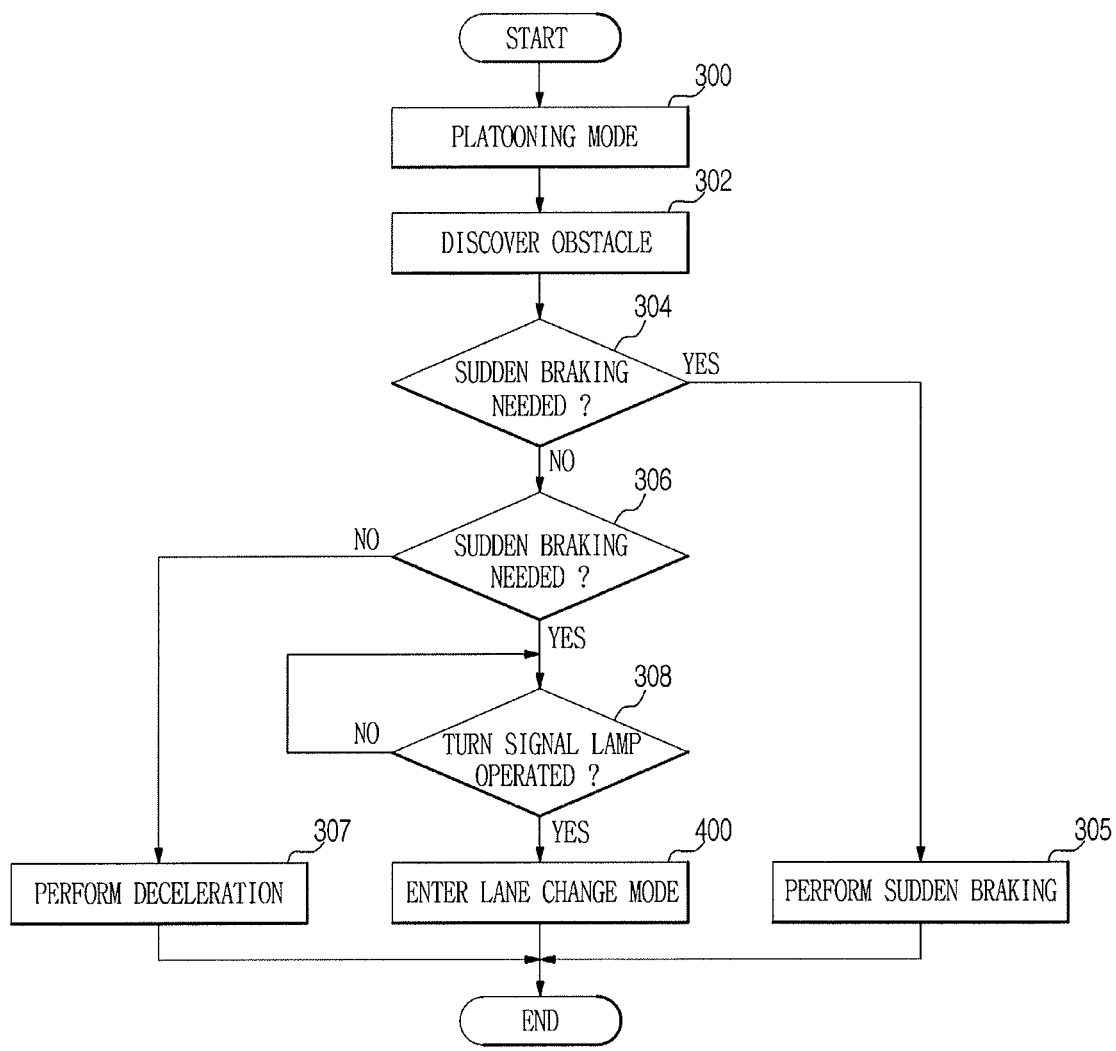
FIG. 3 is a flowchart illustrating a method for entering a lane change mode during platooning of vehicles according to an exemplary embodiment of the present invention.

FIG. 3 is a flowchart illustrating a method for entering a lane change mode during platooning of vehicles according to an exemplary embodiment of the present invention.

Referring to FIG. 3, the platooning vehicles (LV, FV1, FV2, FV3, FV4, FV5 . . . ) may perform a platooning mode in which the following vehicles (FVs) follow the leading vehicle (LV) while simultaneously maintaining a CDG (about 5~15 m) on the basis of the CACC system (300, see FIGS. 1 and 3).

During the platooning mode, the driver of the leading vehicle (LV) may discover a front obstacle (302), and may determine whether sudden braking or sudden deceleration is needed (304).

When sudden braking is needed (304), the driver of the leading vehicle (LV) may decide sudden braking of the platooning vehicles (LV, FV1, FV2, FV3, FV4, FV5 . . . ) (305).

When sudden braking is not required (304), it may be determined whether lane change is needed (306).

When lane change is not required (306), the driver of the leading vehicle (LV) may perform deceleration of the platooning vehicles (LV, FV1, FV2, FV3, FV4, FV5 . . . ) (307).

When lane change is needed (306), the driver of the leading vehicle (LV) may operate the turn signal lamp 220 such that the platooning mode may be switched to a lane change mode (308).

The controller 210 may determine whether the turn signal lamp 220 has operated (308). When the turn signal lamp 220 operates, the controller 210 may enter the lane change mode (400).

A method for controlling platooning of the platooning vehicles (i.e., the leading vehicle (LV) and the following vehicles (FVs; FV1, FV2, FV3, FV4, FV5 . . . )) during the lane change mode will hereinafter be described with reference to FIG. 4.

Figure 4:
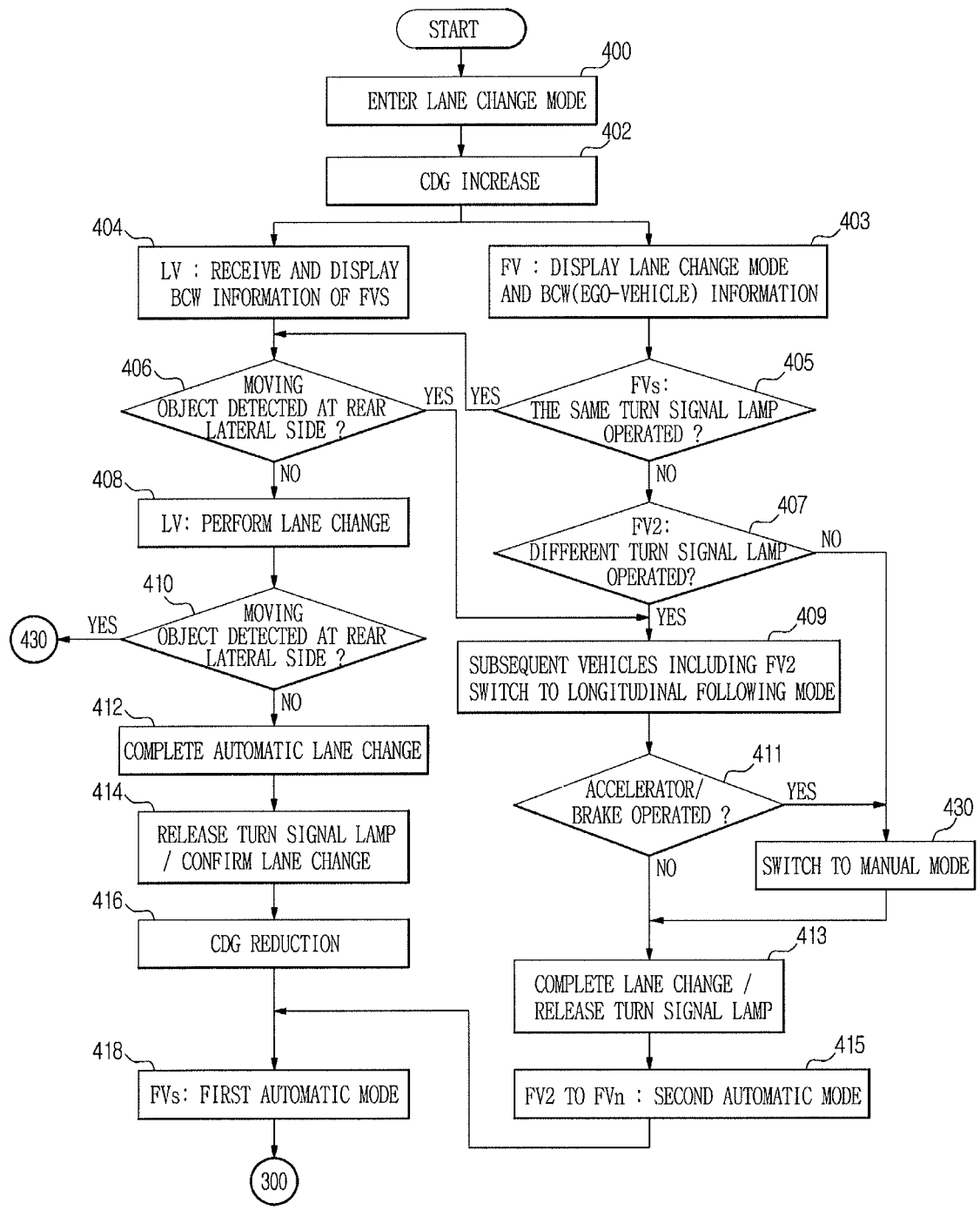
FIG. 4 is a flowchart illustrating a method for controlling a lane change mode during platooning of vehicles according to an exemplary embodiment of the present invention.
Figure 5:
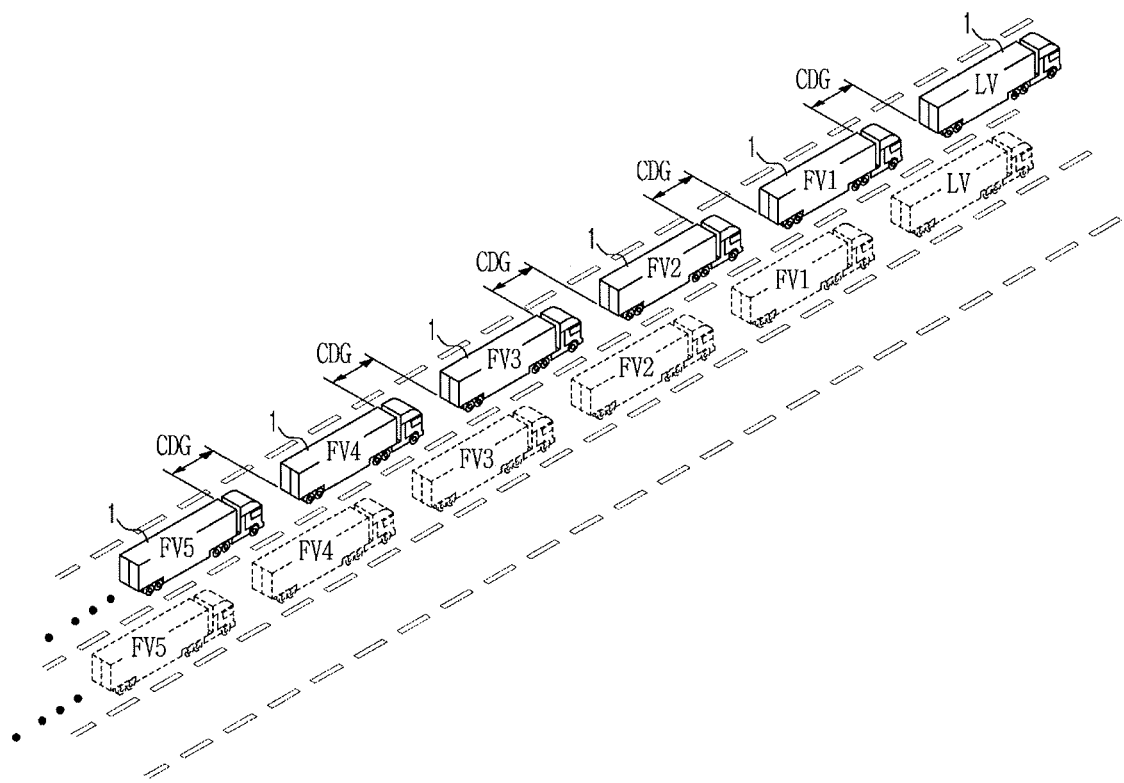
FIG. 5 is a view illustrating vehicle platooning based on a first automatic mode according to an exemplary embodiment of the present invention.
Figure 6:
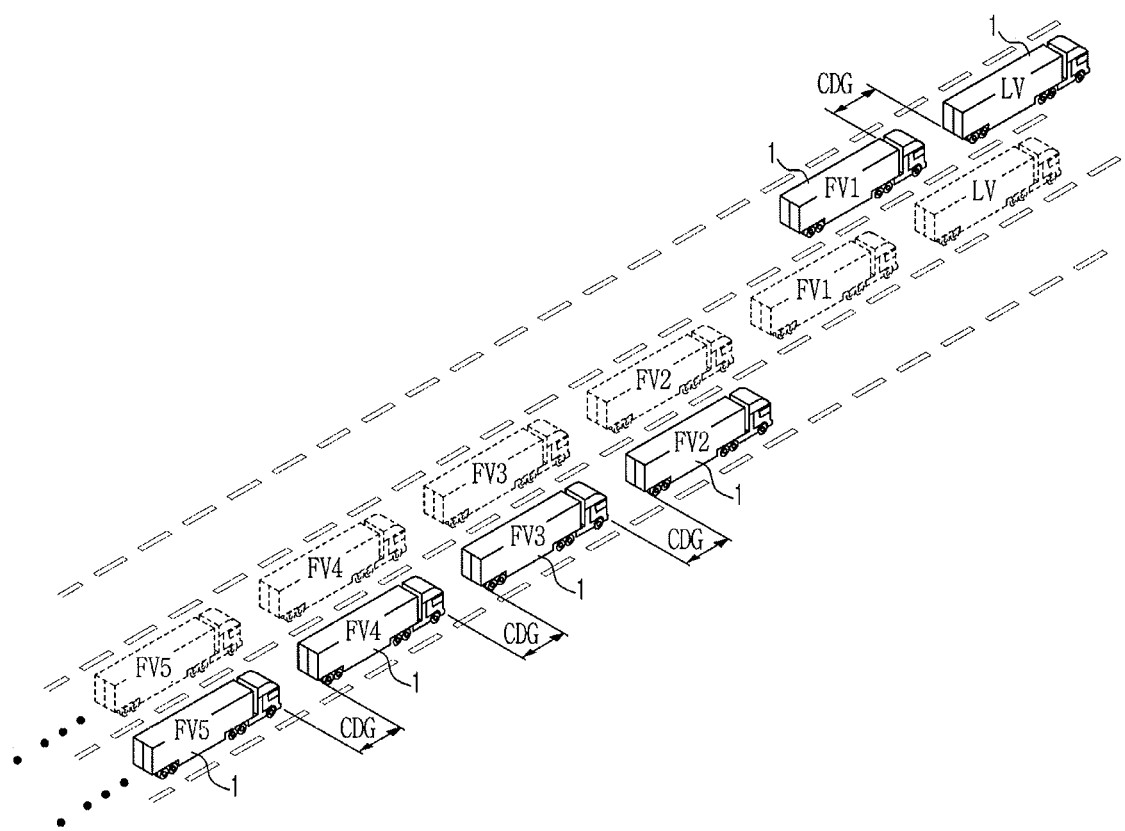
FIG. 6 is a view illustrating vehicle platooning based on a second automatic mode according to an exemplary embodiment of the present invention.

FIG. 4 is a flowchart illustrating a method for controlling a lane change mode during platooning of vehicles according to an exemplary embodiment of the present invention. FIG. 5 is a view illustrating vehicle platooning based on a first automatic mode according to an exemplary embodiment of the present invention. FIG. 6 is a view illustrating vehicle platooning based on a second automatic mode according to an exemplary embodiment of the present invention.

Referring to FIG. 4, when the controller 210 enters the lane change mode (400), a constant distance gap (CDG) between the platooning vehicles (LV, FV1, FV2, FV3, FV4, FV5 . . . ) may increase in length (402). As an example of the CDG increase, when a previous CDG is set to 5 m, the resultant CDG may be set to 10 m. When a previous CDG is set to 15 m, the resultant CDG may be set to 20 m.

The CDG increase may aim to guarantee stability, and may correspond to automatic lane change and manual lane change. For example, when a lane is automatically changed to another lane, the CDG increase may be used to guarantee stability in sudden traveling route change. When a lane is manually changed to another lane, the CDG increase may be used to guarantee the driver's visual field.

Subsequently, when a command for switching a lane change mode of the leading vehicle (LV) is transmitted to the following vehicles (FVs; FV1, FV2, FV3, FV4, FV5 . . . ) through V2V communication, the following vehicles (FVs; FV1, FV2, FV3, FV4, FV5 . . . ) may immediately transmit their BCW information to the leading vehicle (LV), and BCW information related to the ego vehicle and the lane change mode may be displayed on each display 280 of the following vehicles (FVs; FV1, FV2, FV3, FV4, FV5 . . . ) (403).

Therefore, the leading vehicle (LV) may receive BCW information related to the following vehicles (FVs; FV1, FV2, FV3, FV4, FV5 . . . ), and may display BCW information for each of the platooning vehicles (LV, FV1, FV2, FV3, FV4, FV5 . . . ) on the display 280 of the leading vehicle (LV) (404).

Subsequently, the leading vehicle (LV) may receive BCW information from the following vehicles (FVs; FV1, FV2, FV3, FV4, FV5 . . . ), and may thus determine whether the mobile object is located at a rear lateral side of all the platooning vehicles (LV, FV1, FV2, FV3, FV4, FV5 . . . ) (406).

When the mobile object is not present at the rear lateral side of all the platooning vehicles (LV, FV1, FV2, FV3, FV4, FV5 . . . ) (406), the driver of the leading vehicle (LV) may re-operate the turn signal lamp 220 at a lane change moment, and may allow the following vehicles (FVs; FV1, FV2, FV3, FV4, FV5 . . . ) to recognize the lane change moment as well as to perform the lane change (408).

During the lane change mode, all of the platooning vehicles (LV, FV1, FV2, FV3, FV4, FV5 . . . ) may detect the presence or absence of a moving object at a rear lateral side through Blind-spot Collision Warning (BCW) (410).

When the moving object is not present at the rear lateral side of the platooning vehicles (LV, FV1, FV2, FV3, FV4, FV5 . . . ) during the lane change mode (410), automatic lane change of the platooning vehicles (LV, FV1, FV2, FV3, FV4, FV5 . . . ) may be completed (412).

Upon completion of the lane change, the turn signal lamp 220 of each of the platooning vehicles (LV, FV1, FV2, FV3, FV4, FV5 . . . ) may be automatically released or may be manually released by the driver, such that information regarding lane change completion of each vehicle may be announced. Through lane change information acquired by the front-view camera 206, it is determined whether the platooning vehicles (LV, FV1, FV2, FV3, FV4, FV5 . . . ) have performed the lane change (414). As a result, the method for controlling platooning of the vehicles according to the exemplary embodiment may improve the safety of conventional platooning control in which the front-view camera 206 detects only the front vehicle without consideration of information regarding a traveling lane.

Subsequently, the controller 210 of the leading vehicle (LV) may reduce the CDG of the platooning vehicles (LV, FV1, FV2, FV3, FV4, FV5 . . . ) to an initial CDG of the platooning mode (416). As an example of CDG reduction, when the CDG is increased to 10 m, the resultant CDG is reduced to 5 m. When the CDG is increased to 20 m, the resultant CDG is reduced to 15 m.

As described above, the controller 210 may perform a first automatic mode (418) as shown in FIG. 5. During the first automatic mode, the controller 210 may reduce the CDG of the platooning vehicles (LV, FV1, FV2, FV3, FV4, FV5 . . . ) to an initial CDG of the platooning mode, and may complete lane change of the following vehicles (FVs; FV1, FV2, FV3, FV4, FV5 . . . ).

Meanwhile, the driver of the following vehicles (FVs; FV1, FV2, FV3, FV4, FV5 . . . ) may confirm the BCW information and the lane change mode displayed on the display 280 of the ego vehicle (403), may decide whether lane change will be automatically or manually performed through decision of a situation including a BCW, and may inform the leading vehicle (LV) of the decision result.

For example, the controller 210 may determine whether the driver of the following vehicles (FVs; FV1, FV2, FV3, FV4, FV5 . . . ) has operated the same turn signal lamp 220 as the leading vehicle (LV), and may determine whether lane change is automatically performed (405).

When the driver of the following vehicles (FVs; FV1, FV2, FV3, FV4, FV5 . . . ) operates the same turn signal lamp 220 (405), the controller 210 determines completion of the automatic lane change, proceeds back to operation 406, and performs subsequent operations starting from operation 406.

When the driver of the following vehicles (FVs; FV1, FV2, FV3, FV4, FV5 . . . ) does not operate the same turn signal lamp 220 (405), the controller 210 determines whether the driver of the following vehicles (FVs; FV1, FV2, FV3, FV4, FV5 . . . ) has operated another turn signal lamp 220 different from that of the leading vehicle (LV), and determines whether the lane change has been manually performed (407).

When the driver of the following vehicles (FVs; FV1, FV2, FV3, FV4, FV5 . . . ) (for example, the driver of the second following vehicle FV2) operates another turn signal lamp 220 different from that of the leading vehicle (LV) (407), not only the second following vehicle (FV2) but also the following vehicles (FV3, FV4, FV5 . . . ) may automatically switch to a longitudinal following mode (409). The longitudinal following mode may automatically control the CDG, and a lateral direction of the platooning may be controlled by the driver. The control architecture may be broadly classified into two modules (i.e., a longitudinal control module and a lateral control module), and may easily perform switching between the longitudinal control module and the lateral control module by restricting functions of the lateral control module.

The longitudinal following mode may indicate that the driver of the second following vehicle (FV2) has determined that the possibility of danger will be reduced whereas the moving object is present in the BCW region. During the longitudinal following mode, the subsequent following vehicles (FV3, FV4, FV5 . . . ) may follow the second following vehicle (FV2) to actively cope with the traveling situation of the leading vehicle (i.e., the second following vehicle FV2) when a moving object is not present in the BCW region of each subsequent following vehicle (FV3, FV4, FV5 . . . ).

However, under the BCW detected state, although the second following vehicle (FV2) has requested automatic lane change, the requested automatic lane change may be rejected for driver safety, and mode switching to the longitudinal following mode may be conducted.

When lane change is performed according to the longitudinal following mode, active intervention of the driver is needed such that the controller 210 may determine whether the accelerator and the brake have been operated up to a predetermined level or higher by the driver (411).

When the accelerator and the brake do not operate (411), lane change is completed using the longitudinal following mode, and the turn signal lamp 220 of each of the second following vehicle (FV2) and the subsequent following vehicles (FV3, FV4, FV5 . . . ) may be automatically released or may be manually released by the driver, such that information regarding the completed lane change of the following vehicles (FVs) may be announced. Furthermore, through lane information acquired from the front-view camera 206, the controller 210 may determine whether not only the second following vehicle (FV2) but also the subsequent following vehicles (FV3, FV4, FV5 . . . ) have actually performed the lane change through the lane information acquired from the front-view camera 206 (413).

As described above, the controller 210 may perform a second automatic mode (415) (See FIG. 6) and may proceed to operation 418. During the second automatic mode, the controller 210 may complete lane change of not only the second following vehicle (FV2) but also the following vehicles (FV3, FV4, FV5 . . . ).

When the driver of the following vehicles (FVs; FV1, FV2, FV3, FV4, FV5 . . . ) (for example, the driver of the second following vehicle FV2) does not operate another turn signal lamp 220 (407), not only the second following vehicle (FV2) but also the subsequent following vehicles (FV3, FV4, FV5 . . . ) may be switched to the manual mode (430). The reason why operation 430 is performed is that the controller 210 determines that the driver is unable to normally drive the vehicle due to drowsiness, and safety of other platooning vehicles is guaranteed.

When the accelerator and the brake are operated (411), not only the vehicle where driver intervention occurs, but also the subsequent vehicles may switch to the manual mode (430).

As described above, after lane change to the manual mode is completed, the following vehicles (FVs; FV1, FV2, FV3, FV4, FV5 . . . ) may be switched to the first automatic mode after passing through the second automatic mode.

When presence of a moving object located at the rear lateral side of the platooning vehicles (LV, FV1, FV2, FV3, FV4, FV5 . . . ) is detected during lane change (410), not only the vehicle having detected the moving object but also the subsequent vehicles may immediately proceed to operation 430 and may switch to the manual mode (430). The reason why the above operations are performed is that the driver can more accurately determine a current traveling situation at a moment including lane change from the viewpoint of safe driving.

As is apparent from the above description, the apparatus and method for controlling platooning of vehicles according to an exemplary embodiment of the present invention may properly cope with various situations caused by lane change using a lane change mode to automatically cope with the lane change during vehicle platooning, resulting in guarantee of safe driving. Therefore, the driver of a heavy-duty truck may feel sleepy by mental or physical fatigue caused by prolonged driving, or may unexpectedly make a mistake caused by lane change due to a limited visual field of the driver. To address the issues, the apparatus and method for controlling platooning of vehicles according to an exemplary embodiment of the present invention may automatically prevent the driver's mistake that may unexpectedly occur in lane change due to a limited visual field of the driver during vehicle platooning, resulting in reduction of the possibility of traffic accidents. Furthermore, the apparatus configured for controlling vehicle platooning may simply implement manipulation of a lane change mode using a turn signal indicator instead of a separate switch, and may allow the driver to easily perform lane change manipulation, resulting in a minimum number of additional operations causing reduction of the driver's concentration. Although the lane change mode is released, the vehicle may easily re-join in a platoon (sequence of vehicles) after completion of lane change, resulting in increased fuel efficiency. As a result, a technology for automatically performing lane change during subsequent platooning may be acquired.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus configured for controlling platooning between a leading vehicle and a plurality of following vehicles, the apparatus comprising:
   a manipulation portion configured to receive an operation command corresponding to a lane change input by a driver during the platooning, wherein the operation command include a first direction command and a second direction command;
   a detector portion configured to recognize Blind-spot Collision Warning (BCW) information regarding a vehicle; and
   a controller configured to automatically perform the lane change based on the BCW information when the operation command is received by the manipulation portion and the vehicle is the leading vehicle, wherein, when the vehicle is one of the plurality of following vehicles, the controller identifies a direction command of the operation command that is received by the leading vehicle, identifies a direction command of the operation command that is received by the manipulation portion, when the two identified direction commands are the same, automatically perform the lane change based on the BCW information, and when the two identified direction commands are the different, manually perform the lane change based on steering information input by the driver.

2. The apparatus according to claim 1, wherein the plurality of following vehicles constructs a CACC (Cooperative Adaptive Cruise Control) system-based traveling sequence, and travels a platooning mode in which the plurality of vehicles follows the leading vehicle.

3. The apparatus according to claim 1, further comprising a display configured to display the BCW information of the vehicle and the BCW information of other vehicles performing the platooning.

4. The apparatus according to claim 1, wherein the manipulation portion turns on or off one of a first turn signal lamp and second turn signal lamp.

5. The apparatus according to claim 1, wherein the controller is configured to increase a constant distance gap (CDG) when the operation command is received by the manipulation portion.

6. The apparatus according to claim 1, the detector further detects an obstacle in front of the vehicle, and the controller identifies a distance to the detected obstacle and controls deceleration or braking based on the identified distance to the obstacle before automatically performing the lane change.

7. The apparatus according to claim 1, wherein the BCW information is used to detect whether a moving object is present at a rear lateral side of each of the plurality of vehicles.

8. The apparatus according to claim 7, wherein
the controller is configured to perform the lane change, when the moving object is not present at the rear lateral side of each of the plurality of vehicles.

9. The apparatus according to claim 7, wherein
when the vehicle is one of the plurality of following vehicles and the moving object is present, the controller is configured to switch a mode for the lane change to a manual mode.

10. The apparatus according to claim 7,
wherein when the vehicle is one of the plurality of following vehicles and the moving object is present, the controller is configured to switch a mode for the lane change to a longitudinal following mode, and
wherein the longitudinal following mode automatically controls a constant distance gap (CDG) between the vehicle and the other vehicles, and allows a lateral direction of the platooning to be controlled by the driver.

11. An apparatus configured for controlling platooning between a leading vehicle and a plurality of following vehicles the apparatus comprising:
a manipulation portion configured to receive an operation command corresponding to a lane change input by a driver during the platooning, wherein the operation command include a first direction command and a second direction command;

a detector portion configured to detect an obstacle in front, rear and side of a vehicle; and a controller configured to, when the vehicle is the leading vehicle, identify a distance to the obstacle detected by the detector portion, determine when control for deceleration or braking is needed, when control for deceleration or braking is not needed, perform a lane change based on information of the obstacle detected by the detector portion, increase a constant distance gap (CDG) with other vehicles and transmit the operation command to the plurality of following vehicles, wherein, when the vehicle is one of the plurality of following vehicles and the operation command is received by the leading vehicle, the controller identifies a direction command of the operation command that is received by the leading vehicle, identifies a direction command of the operation command that is received by the manipulation portion, when the two identified direction commands are the same, automatically perform the lane change based on the BCW information, and when the two identified direction commands are the different, manually perform the lane change based on steering information input by the driver.

12. The apparatus according to claim 11, wherein the detector portion includes a Blind-spot Collision Warning (BCW) system mounted in the vehicle.

13. The apparatus according to claim 1, wherein the manipulation portion includes turns on or off one of a first turn signal lamp and a second turn signal lamp.

14. The apparatus according to claim 1, wherein the vehicle is the leading vehicle and the operation command is received by the manipulation portion, the controller automatically perform the lane change based on the information of the obstacle.

15. A method for controlling platooning between a leading vehicle and a plurality of following vehicles, the method comprising:
determining, by a controller, whether an operation command is received by a manipulation portion;

increasing, by the controller, a constant distance gap (CDG) between other vehicles performing the platooning when it is determined that the operation command is received;

recognizing, by the controller, Blind-spot Collision Warning (BCW) information regarding each of the plurality of following vehicles and the leading vehicle, when it is determined that the operation command is received; and performing, by the controller, a lane change based on the BCW information, wherein, when the vehicle is one of the plurality of following vehicles, the performing the lane change includes;
identifying a direction command of the operation command that is received by the leading vehicle, identifying a direction command of the operation command that is received by the manipulation portion, automatically performing the lane change based on the BCW information, when the two identified direction commands are the same, and manually performing the lane change based on steering information input by the driver, when the two identified direction commands are the different.

16. The method according to claim 15, further including:
when the vehicle is one of the plurality of following vehicles and a presence of the moving object is detected, switching a mode for the lane change to a manual mode.

17. The method according to claim 15, further including:
when the vehicle is one of the plurality of following vehicles and a presence of the moving object is detected, switching a mode for the lane change to a longitudinal following mode, wherein the longitudinal following mode automatically controls a constant distance gap (CDG) between other vehicles and allows a lateral direction of the platooning to be controlled by the driver.

18. The method according to claim 15, wherein, when the vehicle is the leading vehicle, the performing the lane change, includes:
when the operation command is received by the manipulation portion, automatically performing the lane change based on the information of the BCW information.

* * * * *